N. H. NORRIS.
COMBINATION DIFFERENTIAL DIRECT POWER DRIVE AND FRICTION CLUTCH PULLEY.
APPLICATION FILED MAY 13, 1918.
1,305,616. Patented June 3, 1919.
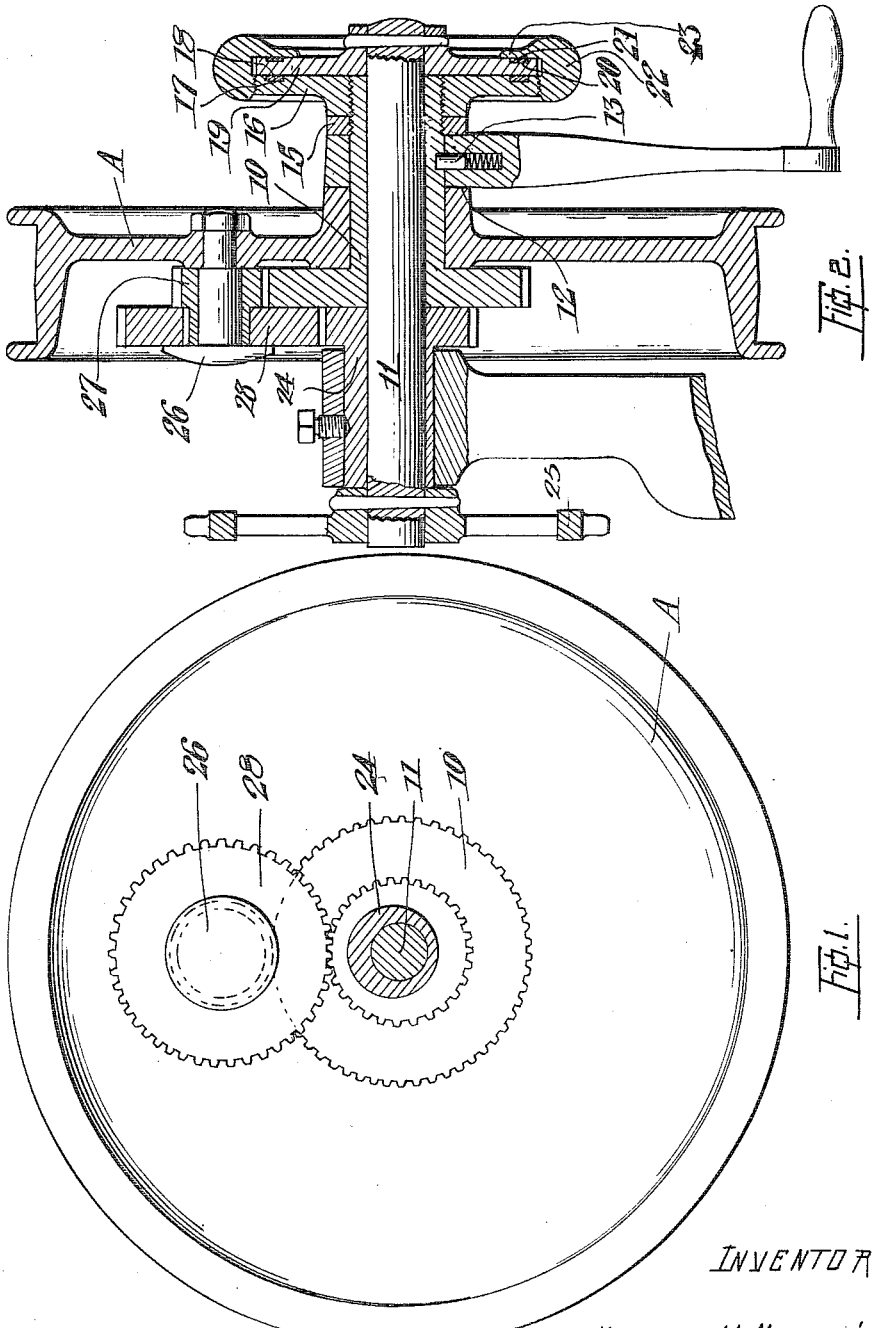
INVENTOR
NELSON. H. NORRIS

UNITED STATES PATENT OFFICE.

NELSON H. NORRIS, OF RENFREW, ONTARIO, CANADA, ASSIGNOR TO RENFREW MACHINERY COMPANY LIMITED, OF RENFREW, ONTARIO, CANADA.

COMBINATION DIFFERENTIAL DIRECT-POWER DRIVE AND FRICTION-CLUTCH PULLEY.

1,305,616.     Specification of Letters Patent.     Patented June 3, 1919.

Application filed May 13, 1918. Serial No. 234,229.

*To all whom it may concern:*

Be it known that I, NELSON HOWARD NORRIS, a subject of the King of Great Britain, and resident of the town of Renfrew, in the Province of Ontario and Dominion of Canada, have invented certain new and useful Improvements in Combination Differential Direct-Power Drives and Friction-Clutch Pulleys, of which the following is a specification.

This invention relates to improvements in combination differential direct power drive and friction clutch pulley, adapted to be used as an attachment to a cream separator or other mechanical device requiring the functioning of such an apparatus, and the objects of the invention are to facilitate reducing the speed from a prime mover to a machine being driven and gradually applying the power to the said machine by the agency of a clutch, and to permit of the clutch being gradually applied allowing slipping to take place until such time as the machine has reached its maximum speed whereupon the clutch may then be tightened to permit of the machine running at a uniform speed.

Further objects are to construct the clutch of co-acting double disks which will not function until they have been drawn together by mechanical means to permit of the clutches being brought gradually into contact until the proper speed has been obtained, and then by reason of a sudden jolt having only sufficient pressure between the friction disks to compensate the shock and gradually bring the machine to a proper condition of speed whereby a maximum efficiency is obtained.

With the above and other objects in view the invention consists essentially of the improved construction particularly described and set forth in the following specification and accompanying drawings forming part of the same.

In the drawings:

Figure 1 is a side elevation of a clutch pulley embodying my invention.

Fig. 2 is a vertical section of the same.

Like characters of reference refer to like parts in the several figures.

Referring to the drawings, A represents a belt pulley rotatably mounted on the sleeve gear 10 which is rotatably mounted on the shaft 11.

This sleeve gear is provided intermediate of its length with a peripheral recess 12 with which the spring controlled pawl 13 carried by the crank handle 14 is adapted to engage.

This crank handle is rotatably mounted on the sleeve 10 and is designed under certain circumstances to permit of the shaft being manually rotated.

The outer end of the gear sleeve 10 is threaded and a check nut 15 mounted thereon, while a friction disk 16 is also threaded on the gear sleeve, and is engaged by the nut 15 or a key to secure same.

The face of the disk 16 is provided with an annular recess 17 in which a leather or like friction washer 18 is secured and the peripheral edge of the disk is threaded.

The shaft 11 extends slightly beyond the disk 16 and carries the disk 19 rigidly mounted thereon by a dowel pin or key, the outer face of the disk 19 being provided with an annular recess 20 in which a ball race or a like friction washer 21 is located.

A hand ring 22 is threaded on the disk 16 and this hand ring is provided with an annular flange 23 which engages with the friction washer 21 so that, as the hand ring 22 is tightened on the disk 16, the disk 19 will be gradually pressed into engagement with the disk 16 and the friction washer 18 will transmit the motion of the disk 16 to the disk 19.

A second sleeve gear 24 is mounted on the shaft 11 and while the gear is concentrically arranged relatively to the shaft, the sleeve is eccentric and acts as a tightening means for a chain which engages with the sprocket 25 keyed to the shaft 11 by a dowel pin key.

A shouldered pin 26 is rigidly secured to the web of the pulley A and carries a rotatable gear 27 which meshes with the gear of the sleeve 10, the gear 27 being provided with a sleeve on which the gear 28 is rigidly mounted, the last said gear meshing with the gear of the sleeve 24.

The assembly of the device will be readily understood from the foregoing description.

When the pulley A is being driven from a source of power, the gear 28 will be rotated by the gear carried by the sleeve 24 which is normally not rotated, and this rotation of the gear 28 is transmitted through the gear 27 to the gear sleeve 10.

To operate now tighten the hand ring 22 gradually bringing the disks 16 and 19 into engagement, and the rotatry motion of the gear sleeve 10 transmitted to the disks 16 carried thereby, is thus transmitted through the friction washer 18 to the disk 19, and results in the rotation of the shaft 11 and sprocket 25 carried thereby.

As the hand ring 22 is gradually tightened a certain amount of slipping will take place between the washer 18 and the disk 19 and the washer 21 and flange 23 of the hand ring, but when the shaft 11 has attained its normal maximum speed, there is sufficient friction to hold and maintain a uniform condition, but the use of the friction washers 18 and 21 will allow for a certain compensating effect between the disks 16 and 19 and the hand ring 22 should a sudden change of speed take place, a jolt from the prime mover or other such cause.

The speed of the prime mover driving the pulley A is reduced to the desired extent through the train of intermeshing gears.

Should it be found necessary for any reason whatsoever to dispense with the use of the prime mover, the crank handle 14 may be manually rotated to transmit motion to the gear sleeve 10 and by tightening the hand ring 22 the disks 16 and 19 will co-act to give the desired rotation to the shaft 11.

It will be understood that the end of pawl 13 is beveled to allow it to slip when a belt drive is applied to the pulley A, and the pawl 13 will thus only function when the crank handle 14 is manually rotated.

As many changes could be made in the above construction and many apparently widely different embodiments of my invention within the scope of the claims, constructed, without departing from the spirit or scope thereof, it is intended that all matter contained in the accompanying specification and drawings shall be interpreted as illustrative and not in a limiting sense.

It will be noted that the eccentric or sleeve 24 is held stationary by a suitable screw passing through a bearing in which the sleeve is seated.

What I claim as my invention is:

1. A device of the class described, comprising a shaft, a sleeve gear rotatably mounted on the shaft, a pulley rotatably mounted on the sleeve, a second sleeve gear on the shaft, gear means carried by the pulley for transmitting motion to the first sleeve gear, and means for transmitting motion from the first sleeve to the shaft.

2. A device of the class described, comprising a shaft, a sleeve gear rotatably mounted on the shaft, a pulley rotatably mounted on the sleeve, a second sleeve gear on the shaft, gear means carried by the pulley for transmitting motion to the first gear sleeve, and clutch means carried by the first sleeve and shaft whereby motion is transmitted to the said shaft.

3. A device of the class described, comprising a shaft, a sleeve gear on the shaft, a second sleeve gear on the shaft, a pulley on the first sleeve gear, idle gears carried by the pulley connecting the said sleeve gears, and clutch means for transmitting rotary motion from the first sleeve gear to the shaft.

4. A device of the class described, comprising a shaft, a sleeve gear on the shaft, a second sleeve gear on the shaft having the sleeve eccentric of the shaft, and the gear concentric of the shaft, idle gears connecting the said sleeve gears, and means for transmitting rotary motion from the first sleeve gear to the shaft.

5. A device of the class described, comprising a shaft, a sleeve gear on the shaft, a pulley rotatably mounted on the sleeve gear, gear means for transmitting motion from the pulley to the sleeve gear, a crank handle on the sleeve, means carried by the crank handle for rotating the sleeve, and means for transmitting the motion of the gear sleeve to the shaft.

In witness whereof I have hereunto set my hand in the presence of two witnesses.

NELSON H. NORRIS.

Witnesses:
E. A. WRIGHT,
F. D. VINCENT.